United States Patent
Baumgaertner

[11] Patent Number: 6,138,429
[45] Date of Patent: Oct. 31, 2000

[54] CROSS MEMBER FOR VEHICLES AND METHOD OF MANUFACTURING SAME

[75] Inventor: Frank Baumgaertner, Karlsdorf-Neuthard, Germany

[73] Assignee: Dr. Ing. h. c. F. Porshe AG, Weissach, Germany

[21] Appl. No.: 09/126,750

[22] Filed: Jul. 31, 1998

[30] Foreign Application Priority Data

Jul. 31, 1997 [DE] Germany .......................... 197 33 191

[51] Int. Cl.[7] ................................. B62D 21/15
[52] U.S. Cl. ................ 52/735.1; 52/731.6; 52/732.1; 52/745.19; 29/897.2; 296/188; 296/189
[58] Field of Search ..................... 52/730.1, 731.1, 52/731.2, 731.6, 732.1, 735.1, 737.1, 737.6, 745.19; 29/897.35, 897.2, 897.312; 296/188, 189, 194, 203.02, 203.03, 205, 146.6; 293/122, 102, 120, 132, 133

[56] References Cited

U.S. PATENT DOCUMENTS

| | | | |
|---|---|---|---|
| 2,082,792 | 6/1937 | Dean ........................................ | 52/737.6 |
| 4,599,843 | 7/1986 | Ingvarsson .............................. | 52/735.1 |
| 4,826,238 | 5/1989 | Misono et al. ....................... | 296/205 X |
| 5,046,777 | 9/1991 | Garnweidner et al. ................ | 296/189 |
| 5,080,410 | 1/1992 | Stewart et al. ..................... | 52/731.6 X |
| 5,080,427 | 1/1992 | Sturrus et al. .......................... | 296/188 |
| 5,085,485 | 2/1992 | Wurl ..................................... | 296/205 X |
| 5,340,178 | 8/1994 | Stewart et al. .......................... | 293/122 |
| 5,371,988 | 12/1994 | Hannes ............................... | 52/731.2 X |
| 5,382,051 | 1/1995 | Glance ................................ | 296/189 X |
| 5,466,032 | 11/1995 | Clausen et al. ......................... | 296/188 |
| 5,560,672 | 10/1996 | Lim et al. . | |
| 5,577,796 | 11/1996 | Clausen .............................. | 29/897.2 X |
| 5,722,708 | 3/1998 | Jonsson .................................... | 293/102 |
| 5,876,078 | 3/1999 | Miskech et al. ..................... | 296/188 X |

FOREIGN PATENT DOCUMENTS

| | | |
|---|---|---|
| 0718157A1 | 6/1996 | European Pat. Off. . |
| 33914960C1 | 2/1990 | Germany . |
| 4009401A1 | 9/1991 | Germany . |
| 4119639A1 | 10/1992 | Germany . |
| 19517918A1 | 11/1996 | Germany . |
| 19517921A1 | 11/1996 | Germany . |
| 6940849T2 | 3/1997 | Germany . |
| 19517921A1 | 11/1998 | Germany . |
| 59-230847 | 12/1984 | Japan . |
| 5-319092 | 12/1993 | Japan .................................. 296/146.6 |
| 2280456 | 2/1995 | United Kingdom .................... 296/188 |
| WO83/02575 | 8/1983 | WIPO . |
| WO 94/20322 | 9/1994 | WIPO ................................ 296/146.6 |

OTHER PUBLICATIONS

Search Report, Jun. 11, 1998, Germany.
Patent Abstracts of Japan, 59230847, Dec. 25, 1984. Synthetic Resin–Made Shock Absorber.
Search Report, Jan. 20, 1999, Europe.

*Primary Examiner*—Laura A. Callo
*Attorney, Agent, or Firm*—Evenson, McKeown, Edwards & Lenahan, P.L.L.C.

[57] ABSTRACT

A cross member for vehicles is constructed as an extruded hollow profile. In order to create a cross member which, in the event of a deformation, has a controlled deformation behavior while simultaneously the energy absorption is good, at least two impact surfaces are provided on the cross member and the impact surfaces are supported by way of webs arranged in pairs with respect to the remaining cross-section of the cross member. The webs assigned to one impact surface are in each case set in the same direction diagonally with respect to the impact direction. In contrast, the setting directions for different impact surfaces are selected in the opposite direction.

30 Claims, 1 Drawing Sheet

CROSS MEMBER FOR VEHICLES AND METHOD OF MANUFACTURING SAME

BACKGROUND AND SUMMARY OF THE INVENTION

This application claims the priority of German application 197 33 191.2, filed in Germany on Jul. 31, 1997, the disclosure of which is expressly incorporated by reference herein.

The invention relates to a cross member for vehicles which is formed as an extruded hollow profile.

A vehicle frame is known from German Patent Document DE 195 17 918 A1 which comprises a side member as well as a cross member which is connected with the side member at the forward end of the side member. The cross member has a connection flange which extends along the cross-sectional height of the side member and which is welded to the side member on one side. On the side of the connection flange situated opposite the side member, the cross member is supported along a cross-sectional area at the connection flange, this cross-sectional area having a lower height than the side member. In the event of a deformation, the connection flange will deform first and, because of its small cross-sectional area on the connection flange, the side member will first penetrate against a slight resistance into the side member. A deformation of the cross member is not disclosed.

With respect to the above, it is an object of the invention to provide a cross member which, in the event of a deformation, has a controlled deformation behavior while simultaneously the energy absorption is good.

According to the invention, this object is achieved by providing a cross member formed as an extruded hollow profile, wherein the cross member has at least two impact surfaces and the impact surfaces are supported by way of webs arranged in pairs of respective interior and exterior webs with respect to the remaining cross-section of the cross member, the interior and exterior webs assigned to each impact surface being inclined in the same direction diagonally with respect to a predetermined impact direction, and wherein the setting direction for the different impact surfaces are selected to extend in opposite diagonal directions.

According to the invention, it is suggested to provide at least two impact surfaces on the cross member and to support the impact surfaces with respect to the remaining cross-section of the cross member by means of webs arranged in pairs. The webs assigned to one impact surface are in each case set in the same direction diagonally with respect to an impact direction. In contrast, the setting directions for different impact surfaces are selected in the opposite direction. As a result, a first cross-sectional area of the cross member constructed in this manner has a comparatively soft construction and, without the forming of any force peaks, initiates the deformation of the cross member. It is a special advantage in this case that, because of the webs arranged in pairs and set diagonally, the impact surfaces carry out a movement transversely to the impact direction.

Since the webs are set in opposite directions on different impact surfaces, a movement of the impact surfaces also takes place in different directions so that the impact surface as a whole is enlarged in the course of an impact induced deformation event. This also increases the moment of resistance transversely to the impact direction so that an escaping of the cross member transversely to the impact direction can be prevented. It is also a special advantage that, because of the transverse movement of the impact surfaces, the surrounding areas are deformed and thus, in the event of an impact, a reduction of the impact energy is achieved not only by deformations in the longitudinal direction but, in addition, by deformations in transverse directions so that, on the whole, the impact energy can be reduced with a lower longitudinal deformation.

For the construction of the first cross-sectional area in certain preferred embodiments, it is further suggested to construct this area such that the diagonally set webs are arranged on longitudinal sides of the impact surfaces. In this case, the bases of those webs which originate from mutually opposite longitudinal sides of the impact surfaces are connected with one another. This geometrical shape can be achieved in a particularly advantageous manner in that an impact surface first constructed in one piece is provided approximately in the center with a flute in the longitudinal direction of the cross member. This flute may be constructed, for example, in a V-shape or a U-shape.

For constructing the cross member, it is further suggested according to certain preferred embodiments to provide a second cross-sectional area adjoining the above-described first cross-sectional area, which second cross-sectional area has a stiffer construction in the deforming direction than the first cross-sectional area. Preferably, the lateral walls of the second cross-sectional area are constructed as continuations of the exterior webs of the first cross-sectional area. In addition, a center web is provided which originates from the connected bases of the interior webs. This second cross-sectional area has the task of reducing impact energy by deformation during the deformation process after the deformation path of the first cross-sectional area is exhausted. As a result of the fact that the second cross-sectional area is constructed as a continuation of the first cross-sectional area, force peaks can be securely avoided.

Finally, it is suggested according to certain preferred embodiments to provide a third cross-sectional area adjoining the second cross-sectional area, which third cross-sectional area has a stiffer construction than the second cross-sectional area. This third cross-sectional area has the task of ensuring the basic stiffness of the cross member so that the forces occurring at the cross member during the deformation of the first and of the second cross-sectional area can be introduced into the adjoining support structure of the vehicle, for example, the side members. This third cross-sectional area therefore has such a stiff construction that it is significantly deformed neither during the deformation of the first and of the second cross-sectional area, nor during the further introduction of force immediately following.

It should particularly be pointed out that the advantageous construction of the first cross-sectional area can also be combined with arbitrary second cross-sectional areas (if no third cross-sectional area is provided) or with arbitrary second and third cross-sectional areas.

Other objects, advantages and novel features of the present invention will become apparent from the following detailed description of the invention when considered in conjunction with the accompanying drawings.

DETAILED DESCRIPTION OF THE DRAWINGS

Figure 1:
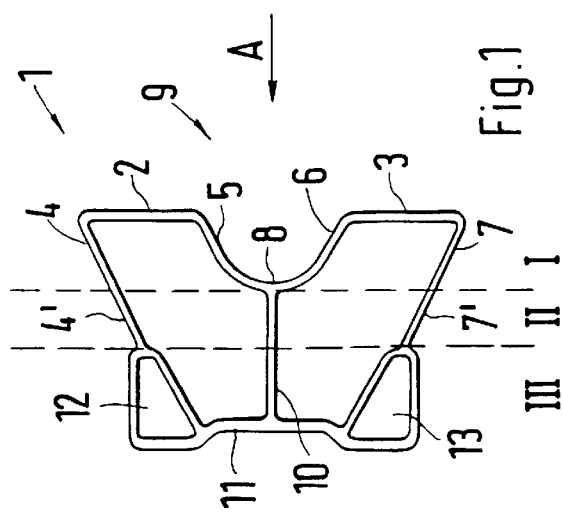
FIG. 1 is a cross-sectional view of a cross member constructed according to a preferred embodiment of the invention in the undeformed condition.

FIG. 1 illustrates a cross member 1 which, in the illustrated embodiment, is constructed as an extruded hollow aluminum profile. The profile 1 has three cross-sectional areas I, II and III. "A" marks an impact direction; the introduction of force into the cross member 1 takes place from this direction A.

The cross member 1 is mounted on a vehicle (not shown) in the forward area of the vehicle and has the purpose of absorbing, in the event of an impact of the vehicle onto an obstacle, in a first phase, a portion of the impact energy by the deformation of the cross member 1 and, in a second phase, of introducing impact energy into a frame structure of the vehicle. For the mounting on the vehicle, the cross member 1 is connected to the frame structure of the vehicle in a manner not shown in detail on its side facing away from the impact direction A and may also be covered by means of covering parts. These covering parts may also be held on the cross member 1.

The cross member 1 has three cross-sectional areas I, II and III which are successively arranged in the impact direction A.

The first cross-sectional area I has two impact surfaces 2, 3 which are arranged in a plane and essentially perpendicularly to the impact direction A. Webs 4 to 7 adjoin longitudinal sides of the impact surfaces 2, 3. The exterior webs 4, 7 are arranged on the exterior longitudinal sides of the pertaining impact surfaces 2, 3. The interior webs 5, 6 are arranged on the interior, mutually opposite longitudinal sides of the impact surfaces 2, 3 and are connected with one another at a base 8. The webs 4, 5 originating from the first impact surface 2 are sloped downward toward the impact direction A and are arranged essentially in parallel to one another. In contrast thereto, the webs 6, 7 assigned to the second impact surface 3 are arranged to be rising toward the impact direction A and are also arranged essentially in parallel to one another. In the embodiment shown, the interior webs 5, 6 form a flute 9 between the impact surfaces 2 and 3.

The second cross-sectional area II consists of three webs 4', 7' and 10. The exterior webs 4' and 7' are continuations of the exterior webs 4 and 7 of the first cross-sectional area I. The center web 10 starts at the base 8 and in this manner supports the interior webs 5, 6 of the first cross-sectional area I on a floor plate 11.

The third cross-sectional area III consists of two closed profiles 12, 13 with a respective triangular cross-section which are connected with one another by the floor plate 11.

On the whole, the cross member 1 is constructed as a hollow extruded profile with four chambers and, because of the smaller number of interior webs (center web 10 and interior section of the profiles 12, 13), is particularly suited for a manufacturing by means of the extrusion process. For representing the deformation of the cross member 1 in the event of an impact in the impact direction A, it is assumed that the impact takes place onto a flat object which extends perpendicularly with respect to the impact direction A.

Figure 2:
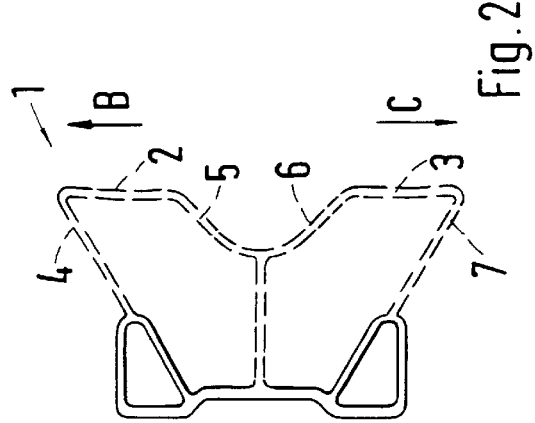

FIG. 2 shows the cross member immediately after the start of the introduction of force as the result of an impact. Because of the introduced force, the webs 4, 5 extend outwardly in the direction of the arrow B, and the webs 6, 7 extend out in the direction of the arrow C. This results in a displacement of the first impact surface 2 in the direction of the arrow B as well as a displacement of the second impact surface 3 in the direction of the arrow C.

Figure 3:
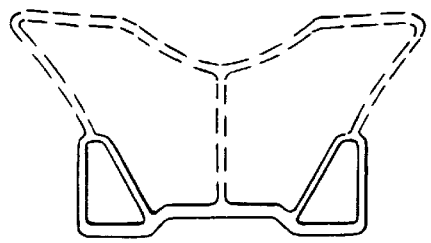
FIGS. 2 to 6 are cross-sectional views of the cross member of FIG. 1 during the deformation of a first and a second crosssectional area.

FIG. 3 shows another deformation in the manner described above because of another introduction of force.

Figure 4:
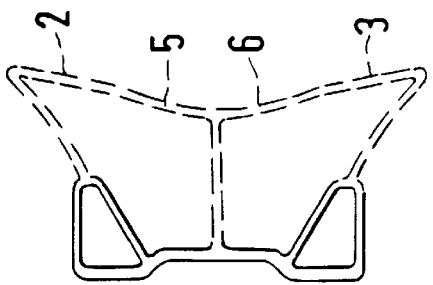

As illustrated in FIG. 4, as the result of the deformation, the interior webs 5, 6 are already folded over so far that, together with the impact surfaces 2, 3, they form a surface (which is not yet flat here).

Figure 5:
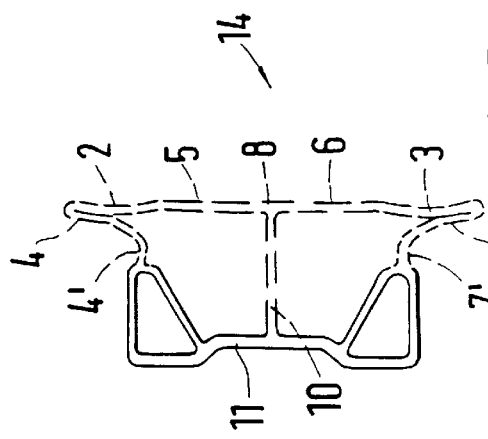

As illustrated in FIG. 5, a continuous impact surface 14 has now been formed consisting of the impact surfaces 2 and 3 as well as the interior webs 5 and 6. The exterior webs 4, 7 are also completely folded over and rest against the impact surfaces 2, 3 on the back side of these impact surfaces 2, 3. As a result of this folding-over, the sections 4' and 7' of the exterior webs 4 and 7, which are part of the second cross-sectional area II, are now approximately in parallel to the impact direction A. In the condition illustrated in FIG. 5, the deformation path of the first cross-sectional area I is now completely consumed, while the second deformation area II as well as the third deformation area III are still essentially undeformed.

Figure 6:
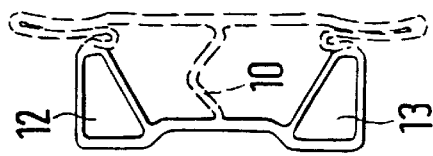

In FIG. 6, the second cross-sectional area II is finally also deformed. The sections 4' and 7', which had previously been slightly buckled because of the deformation of the exterior webs 4, 7, are now completely folded together. The center web 10, which had not been bent out in the condition illustrated in FIG. 5, is then buckled out as shown. The buckling-out of the center web 10 is facilitated in that the center web 10 extends through the third cross-sectional area III to the floor plate 11 so that a sufficient buckling length is obtained.

It should be pointed out that, also in the deformation condition illustrated in FIG. 6, the profiles 12, 13 and therefore the third cross-sectional area III are not deformed. Also during a further introduction of force, the third cross-sectional area III is not deformed further, but the forces introduced into the impact direction A are now transmitted to the frame structure of the vehicle with which the cross member 1 is connected.

Summarizing, the illustrated structure of the cross member 1 has the effect that a deformation of the cross member 1 enlarges the impact surface during the deformation and the moment of resistance is therefore increased. Furthermore, as the result of the transverse movement of the impact surfaces 2, 3, additional impact energy is absorbed by a deformation in the transverse direction so that the deformation in the impact direction A is reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An extruded hollow profile cross member for vehicles, comprising:

first and second laterally spaced impact surface sections having impact receiving surfaces facing a first direction, and support webs extending in a direction opposite the first direction and supporting the impact surface sections, said support webs including:

a first support web connected to a laterally outward part of the first impact surface section, a second support web connected to a laterally inward part of the first impact surface section, a third support web connected to a laterally outward part of the second impact surface section, a fourth support web connected to a laterally inward part of the second impact surface section, and a fifth support web connected to laterally adjacent ends of the second and fourth support webs, wherein the second, fourth and fifth support webs form a y-shaped cross-section with the second and fourth support webs forming respective arms of the y-shaped cross-section, comprising a rigid support section exhibiting at least one hollow profile, wherein said first, third and fifth support webs are connected to the rigid support section.

2. A cross member according to claim 1, wherein said first, second, third, fourth and fifth support webs are all configured to be plastically deformable in response to impact load on the impact surface sections.

3. A cross member according to claim 1, wherein the first and third webs extend inclined diagonally laterally outwardly from the rigid support section to respective laterally outward ends of the first and second impact sections.

4. A cross member according to claim 3, wherein the second and fourth webs extend inclined diagonally outward from the fifth support web to respective laterally inward ends of the first and second impact sections.

5. A cross member according to claim 1, wherein the second and fourth webs extend inclined diagonally outward from the fifth support web to respective laterally inward ends of the first and second impact sections.

6. A cross member according to claim 1, wherein the impact surface sections and the support webs are disposed symmetrically with respect to a center plane extending intermediate the first and second impact sections.

7. A cross member according to claim 1, wherein the rigid support section includes two hollow profiles.

8. A cross member according to claim 7, wherein said hollow profiles are disposed symmetrically with respect to a center plane intermediate the impact sections.

9. A cross member according to claim 8, wherein said hollow profiles are triangular in shape.

10. A cross member according to claim 9, wherein bases of said triangular shaped profiles extend parallel to the impact surfaces when the cross member is in an in use undeformed condition, and wherein respective apices of the triangular shaped profiles are connected to the respective first and third support webs.

11. A cross member according to claim 9, wherein apices of said triangular shaped profiles are connected respectively to the first and third webs.

12. An extruded hollow profile cross member for vehicles, comprising:

first and second laterally spaced impact surface sections having impact receiving surfaces facing a first direction, and support webs extending in a direction opposite the first direction and supporting the impact surface sections, said support webs including:
a first support web connected to a laterally outward part of the first impact surface section,
a second support web connected to a laterally inward part of the first impact surface section,
a third support web connected to a laterally outward part of the second impact surface section,
a fourth support web connected to a laterally inward part of the second impact surface section, and
a fifth support web connected to laterally adjacent ends of the second and fourth support webs, wherein the second, fourth and fifth support webs form a y-shaped cross-section with the second and fourth support webs forming respective arms of the y-shaped cross-section, wherein the impact surface sections and the support webs are disposed symmetrically with respect to a center plane extending intermediate the first and second impact sections.

13. An extruded hollow profile cross member for vehicles comprising:

An extruded hollow profile cross member for vehicles, comprising:

first and second laterally spaced impact surface sections having impact receiving surfaces facing a first direction, a rigid support section exhibiting at least one hollow profile disposed spaced from the impact surface sections in a second direction opposite the first direction, and plastically deformable support webs interposed between the impact surface sections and the rigid support section, wherein the support webs include:
a first support web connected to a laterally outward part of the first impact surface section,
a second support web connected to a laterally inward part of the first impact surface section,
a third support web connected to a laterally outward part of the second impact surface section,
a fourth support web connected to a laterally inward part of the second impact surface section, and
a fifth support web connected to laterally adjacent ends of the second and fourth support webs, wherein said second and fourth support webs are connected together at a junction point at ends thereof spaced from the impact surface sections.

14. A cross member according to claim 13, wherein said support webs include said fifth support web extending between the rigid support section and the junction point.

15. A cross member according to claim 14, wherein the impact surface sections and respective support webs are disposed symmetrically with respect to a center plane through the junction point and intermediate the first and second impact sections.

16. A cross member according to claim 15, wherein said first, second, third, fourth and fifth support webs are all configured to be plastically deformable in response to impact load on the impact surface sections.

17. A cross member according to claim 13, wherein the rigid support section includes two hollow profiles.

18. A cross member according to claim 17, wherein said hollow profiles are disposed symmetrically with respect to a center plane intermediate the first and second impact sections.

19. An extruded hollow profile cross member for vehicles, comprising:

first and second laterally spaced impact surface sections having impact receiving surfaces facing a first direction, a rigid support section exhibiting at least one hollow profile disposed spaced from the impact surface sections in a second direction opposite the first direction, and plastically deformable support webs interposed between the impact surface sections and the rigid support section, wherein the rigid support section includes two hollow profiles, wherein said hollow profiles are disposed symmetrically with respect to a center plane intermediate the first and second impact sections, and wherein said hollow profiles are triangular in shape.

20. A cross member according to claim 19, wherein bases of said triangular shaped profiles extend in parallel to the impact surface sections when the cross member is in an in use undeformed condition.

21. A method of manufacturing a cross member for vehicles comprising extruding the cross member as a hollow continuous profile, wherein said cross member comprises:

first and second laterally spaced impact surface sections having impact receiving surfaces facing a first direction, and support webs extending in a direction opposite the first direction and supporting the impact surface sections, said support webs including:

a first support web connected to a laterally outward part of the first impact surface section, a second support web connected to a laterally inward part of the first impact surface section, a third support web connected to a laterally outward part of the second impact surface section, a fourth support web connected to a laterally inward part of the second impact surface section, and a fifth support web connected to laterally adjacent ends of the second and fourth support webs, wherein the second, fourth and fifth support webs form a y-shaped cross-section with the second and fourth support webs forming respective arms of the y-shaped cross-section, wherein said first, second, third, fourth and fifth support webs are all configured to be plastically deformable in response to impact load on the impact surface sections, wherein the cross member further includes a rigid support section exhibiting at least one hollow profile, and wherein said first, third and fifth support webs are connected to the rigid support section.

22. A method according to claim 21, wherein the first and third webs extend inclined diagonally laterally outwardly from the rigid support section to respective laterally outward ends of the first and second impact sections.

23. A method according to claim 22, wherein the second and fourth webs extend inclined diagonally outward from the fifth support web to respective laterally inward ends of the first and second impact sections.

24. A method according to claim 21, wherein the impact surface sections and the support webs are disposed symmetrically with respect to a center plane extending intermediate the first and second impact sections.

25. A method of manufacturing a cross member for vehicles comprising extruding the cross member as a hollow continuous profile, wherein said cross member comprises:

first and second laterally spaced impact surface sections having impact receiving surfaces facing a first direction, a rigid support section exhibiting at least one hollow profile disposed spaced from the impact surface sections in a second direction opposite the first direction, and plastically deformable support webs interposed between the impact surface sections and the rigid support section, wherein the support webs include:

a first support web connected to a laterally outward part of the first impact surface section, a second support web connected to a laterally inward part of the first impact surface section, a third support web connected to a laterally outward part of the second impact surface section, a fourth support web connected to a laterally inward part of the second impact surface section, and a fifth support web connected to laterally adjacent ends of the second and fourth support webs, wherein said second and fourth support webs are connected together at a junction point at ends thereof spaced from the impact surface sections.

26. A method according to claim 25, wherein said support webs include said fifth support web extending between the rigid support section and the junction point.

27. A method according to claim 26, wherein the impact surface sections and respective support webs are disposed symmetrically with respect to a center plane through the junction point and intermediate the first and second impact sections.

28. A method according to claim 27, wherein said first, second, third, fourth and fifth support webs are all configured to be plastically deformable in response to impact load on the impact surface sections.

29. A method according to claim 25, wherein the rigid support section includes two hollow profiles.

30. A method according to claim 29, wherein said hollow profiles are disposed symmetrically with respect to a center plane intermediate the first and second impact sections.

* * * * *